US008591043B2

(12) United States Patent
Wakabayashi et al.

(10) Patent No.: US 8,591,043 B2
(45) Date of Patent: Nov. 26, 2013

(54) LIGHT MODULATION DEVICE AND PROJECTOR

(75) Inventors: Shinichi Wakabayashi, Suwa (JP); Yoshitaka Hama, Chinoshi (JP)

(73) Assignee: Seiko Epson Corporation, Tokyo (JP)

( * ) Notice: Subject to any disclaimer, the term of this patent is extended or adjusted under 35 U.S.C. 154(b) by 262 days.

(21) Appl. No.: 13/165,320

(22) Filed: Jun. 21, 2011

(65) Prior Publication Data

US 2011/0310359 A1  Dec. 22, 2011

(30) Foreign Application Priority Data

Jun. 22, 2010  (JP) .................................. 2010-141384

(51) Int. Cl.
  *G03B 21/14*  (2006.01)
(52) U.S. Cl.
  USPC ............................................. 353/97; 353/52
(58) Field of Classification Search
  USPC .......... 353/52, 97, 88, 81, 33, 55, 56; 349/58, 349/59, 60; 359/831
  See application file for complete search history.

(56) References Cited

U.S. PATENT DOCUMENTS

| 6,488,380 | B1 * | 12/2002 | Fujimori | 353/119 |
| 6,834,964 | B2 * | 12/2004 | Nishihara et al. | 353/52 |
| 7,023,504 | B2 * | 4/2006 | Miyashita et al. | 349/58 |
| 7,148,945 | B2 * | 12/2006 | Yanagisawa | 349/161 |
| 7,365,821 | B2 * | 4/2008 | Dewa et al. | 349/161 |
| 2004/0212747 | A1 * | 10/2004 | Saitoh et al. | 349/6 |
| 2009/0323025 | A1 * | 12/2009 | Nagumo | 353/20 |
| 2010/0039621 | A1 * | 2/2010 | Hayashi et al. | 353/20 |
| 2011/0292353 | A1 * | 12/2011 | Iwane et al. | 353/85 |
| 2012/0008097 | A1 * | 1/2012 | Okamuro et al. | 353/20 |
| 2013/0083268 | A1 * | 4/2013 | Hirabayashi | 349/58 |

FOREIGN PATENT DOCUMENTS

JP  A-2010-8638  1/2010

* cited by examiner

*Primary Examiner* — William C Dowling
(74) *Attorney, Agent, or Firm* — Oliff & Berridge, PLC

(57) ABSTRACT

A light modulation device includes: a reflective light modulation element which modulates an incident light; a holding section which holds the reflective light modulation element; and a light blocking plate disposed on an incident side which incidents the incident light to the reflective light modulation element, and fixed to the holding section, wherein a thermal conductivity of the light blocking plate is equal to or higher than a thermal conductivity of the holding section.

6 Claims, 6 Drawing Sheets

LIGHT MODULATION DEVICE AND PROJECTOR

BACKGROUND

1. Technical Field

The present invention relates to a light modulation device and a projector.

2. Related Art

There has been known a projector provided with a light source, a light modulation device for modulating the light emitted from the light source, and a projection optical device for projecting the light modulated by the light modulation device in an enlarged manner. Further, there is known a projector (see, e.g., JP-A-2010-8638 (Document 1)), which is the type of such a projector, and provided with a reflective light modulation device. In the projector described in Document 1, the light modulation device is provided with a reflective liquid crystal panel, and a holding section for holding the reflective liquid crystal panel, and is attached to a mounting member having a triangular prism shape.

No matter whether the liquid crystal panel is of the reflective type or the transmissive type, the light input from the light source is absorbed by the liquid crystal layer, various wiring lines, the black matrix, and so on, to thereby raise the temperature. Since the deterioration of quality is incurred if the liquid crystal panel is exposed to a high-temperature environment, it is desirable to perform cooling of the liquid crystal panel sufficiently. Therefore, in the projector described in Document 1, a heat sink for cooling the reflective liquid crystal panel is further disposed on the back side of the light modulation device attached to the mounting member, and is arranged that the cooling air is fed toward the mounting member.

However, in the projector described in Document 1, the light modulation device is attached so that the incident side of the reflective liquid crystal panel faces the mounting member, and the internal space of the mounting member is in a sealed state. Therefore, since it is hard for the cooling air to be guided to the incident side compared to the transmissive light modulation device in which the cooling air is also guided to the incident side, the heat radiation on the incident side of the reflective liquid crystal panel becomes insufficient. Therefore, there arises a problem that cooling of the reflective liquid crystal panel becomes insufficient to thereby cause the reflective liquid crystal panel to be exposed to a high-temperature environment, and as a result, the quality of the reflective liquid crystal panel might be deteriorated.

SUMMARY

An advantage of some aspects of the invention is to solve at least a part of the problem described above, and the invention can be implemented as following forms or application examples.

Application Example 1

This application example of the invention is directed to a light modulation device including a reflective light modulation element which modulates an incident light, a holding section which holds the reflective light modulation element, and a light blocking plate disposed on an incident side which incidents the incident light to the reflective light modulation element, and fixed to the holding section, wherein a thermal conductivity of the light blocking plate is equal to or higher than a thermal conductivity of the holding section.

According to this configuration, since the thermal conductivity of the light blocking plate disposed on the incident side of the reflective light modulation element is equal to or higher than the thermal conductivity of the holding section, the radiation of the heat transferred from the reflective light modulation element, to which the light is input, and in which temperature rise is caused, via the holding section from the incident side is promoted. Thus, since the reflective light modulation element can effectively be cooled, degradation of the quality of the reflective light modulation element due to the heat can be prevented, and as a result, the product life of the light modulation device can be elongated.

Application Example 2

In the light modulation device of the application example of the invention, it is preferable that the light blocking plate has a concavo-convex pattern on a surface on the incident side.

According to this configuration, since the concavo-convex pattern is formed on the incident side surface of the light blocking plate, the surface area of the heat radiation surface increases. Thus, since the heat radiation effect of the light blocking plate can be enhanced, it is possible to more effectively cool the reflective light modulation element. Further, the light reflected by the surface of the light blocking plate, namely the light failing to be modulated by the reflective light modulation element, is scattered by the concavo-convex pattern and directed toward the outside of the light path of the light modulated by the reflective light modulation element. Thus, it is prevented that the light reflected by the surface of the light blocking plate is mixed into the light modulated by the reflective light modulation element.

Application Example 3

In the light modulation device of the application example of the invention, it is preferable that the light blocking plate has a fin-like section on a surface on the incident side.

According to this configuration, since the fin-like section is formed on the incident side surface of the light blocking plate, the heat radiation from the incident side of the reflective light modulation element is further promoted. Thus, the reflective light modulation element can more effectively be cooled.

Application Example 4

In the light modulation device of the application example of the invention, it is preferable that a heat sink disposed on an opposite side to the incident side of the reflective light modulation element is further provided, and the light blocking plate is connected to the heat sink in a thermally conductive manner.

According to this configuration, since the heat radiation from the opposite side to the incident side is promoted by the heat sink, and the heat on the incident side is transferred to the heat sink and is also radiated from the opposite side to the incident side due to the thermally conductive connection of the light blocking plate to the heat sink, the reflective light modulation element can further effectively be cooled.

Application Example 5

This application example of the invention is directed to a projector including a light source, a light modulation device according to any of the application examples of the invention, and adapted to modulate the light emitted from the light source, and a projection optical device which projects a light modulated by the light modulation device.

According to this configuration, the projector is provided with a light modulation device having a quality prevented from being degraded due to the heat of the reflective light modulation element. Therefore, the longer product life of the projector can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention will hereinafter be described with reference to the accompanying drawings. It should be noted that in each of the drawings referred to below, the dimensional ratio and so on of each of the constituents is arbitrarily made different from each other in order to make the configuration easy to understand.

First Embodiment

Projector

Figure 1:
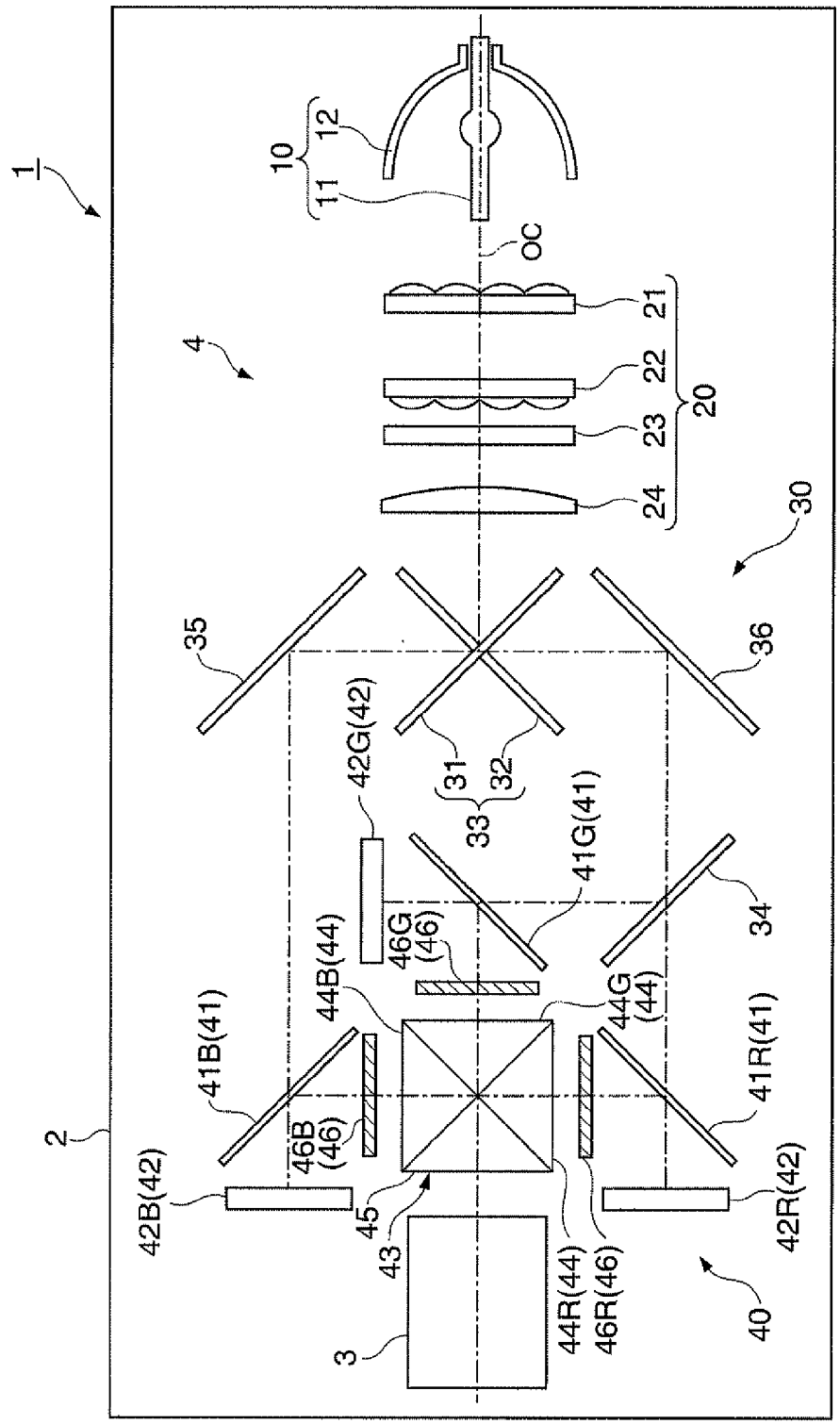
FIG. 1 is a diagram schematically showing a configuration of a projector according to a first embodiment of the invention.
Figure 2:
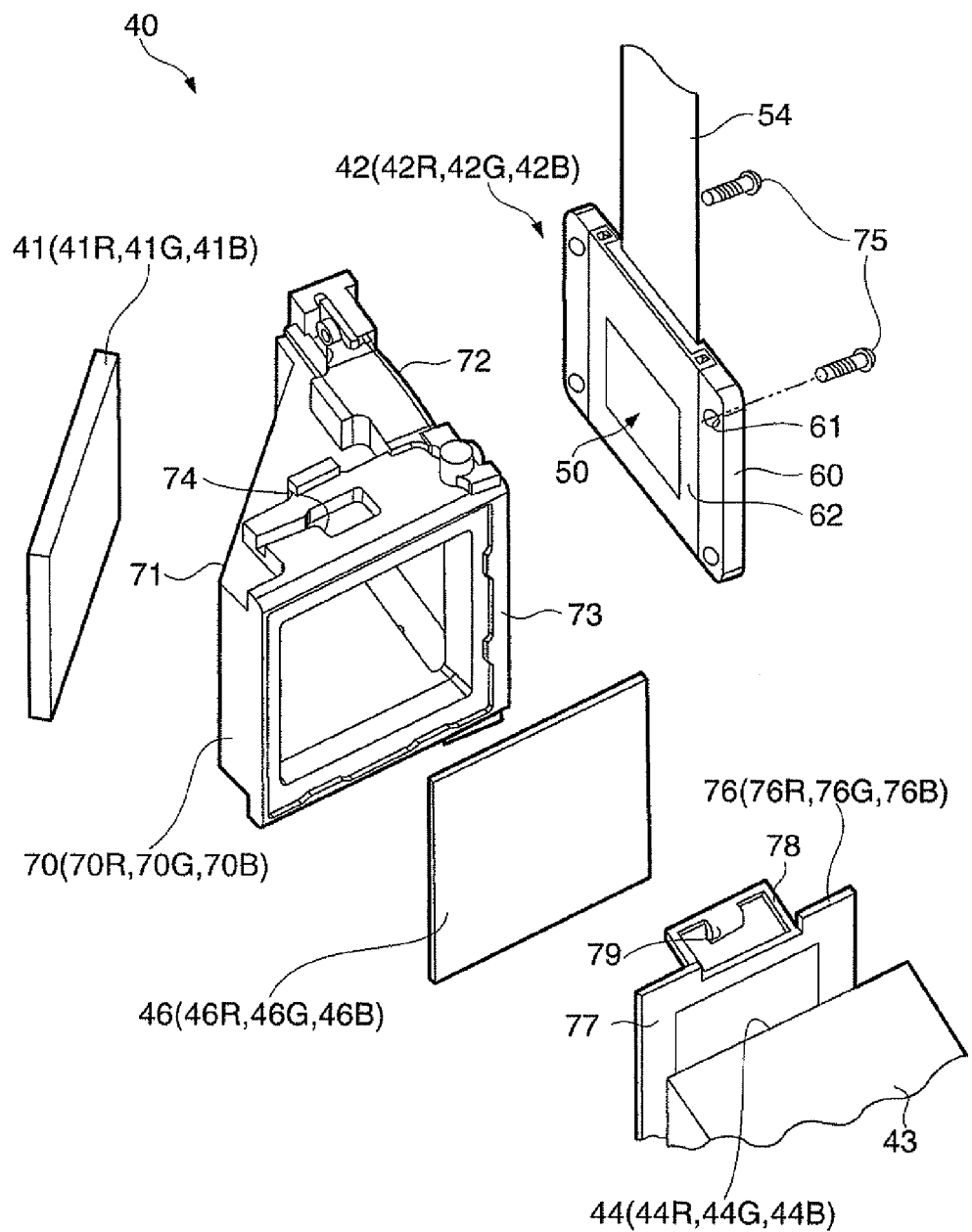
FIG. 2 is an exploded perspective view showing a mounting section of a light modulation device according to the first embodiment.

Firstly, the projector according to the first embodiment will be explained with reference to FIGS. 1 and 2. FIG. 1 is a diagram schematically showing a configuration of the projector according to the first embodiment. FIG. 2 is an exploded perspective view showing a mounting section of a light modulation device according to the first embodiment.

The projector 1 according to the first embodiment modifies the light emitted from the light source in accordance with the image information, and then projects it on a projection surface such as a screen in an enlarged manner. As shown in FIG. 1, the projector 1 is provided with a case 2, a projection lens 3 as a projection optical device, and an optical unit 4. An illumination light axis OC corresponds to the center axis of the light emitted from a light source device 10 described later.

It should be noted that although omitted from the drawings, the projector 1 is further provided with a cooling fan for cooling the constituents located inside the projector 1, a power supply device for supplying each of the constituents located inside the projector 1 with electric power, and a control device for controlling the constituents located inside the projector 1, located in a space inside the case 2 excluding the projection lens 3 and the optical unit 4.

The projection lens 3 and the optical unit 4 are aligned with respect to the illumination light axis OC and fixed to the case 2. The projection lens 3 is configured as a combination lens in which a plurality of lenses are combined with each other, and projects the light modulated by the optical unit 4 to the projection surface such as a screen in an enlarged manner. The optical unit 4 is a unit for optically processing the light emitted from the light source in accordance with the image signal. The optical unit 4 is provided with the light source device 10, an illumination optical device 20, a color separation optical device 30, and an optical device 40.

The light source device 10 is provided with a light source lamp 11 and a reflector 12. In the light source device 10, the light emitted from the light source lamp 11 is aligned in the emission direction by the reflector 12, and is emitted toward the illumination optical device 20.

The illumination optical device 20 is provided with a first lens array 21, a second lens array 22, a polarization conversion element 23, and an overlapping lens 24. The first lens array 21 divides the light emitted from the light source device 10 into a plurality of partial lights. Further, the second lens array 22 is collects the plurality of partial lights divided into by the first lens array 21. The polarization conversion element 23 converts each of the partial lights from the second lens array 22 into a substantially unique linearly polarized light having a uniform polarization direction, and then emits the resulted partial lights. The overlapping lens 24 overlaps the plurality of partial lights emitted from the polarization conversion element 23 as the linearly polarized lights on the surface of a reflective liquid crystal panel 50 (see FIG. 2) of each of three light modulation devices 42.

The color separation optical device 30 is provided with a cross dichroic mirror 33 composed of a dichroic mirror 31 for reflecting the blue light and a dichroic mirror 32 for reflecting the green light and the red light disposed to have an X-shape, a dichroic mirror 34 for reflecting the green light, and two reflecting mirrors 35, 36. The color separation optical device 30 separates the plurality of partial lights emitted from the illumination optical device 20 into colored lights of the three colors, namely red, green, and blue.

The blue light separated by the cross dichroic mirror 33 is reflected by the reflecting mirror 35, and then enters a wire grid 41B of the optical device 40. Further, the green light and red light separated by the cross dichroic mirror 33 are reflected by the reflecting mirror 36, and then enter the dichroic mirror 34. The green light is reflected by the dichroic mirror 34, and then enters a wire grid 41G of the optical device 40. On the other hand, the red light is transmitted through the dichroic mirror 34, and then enters a wire grid 41R of the optical device 40.

The optical device 40 modulates the incident light in accordance with the image information. The optical device 40 is provided with a head body (not shown), the three wire grids 41 (41R, 41G, and 41B), the three light modulation devices 42 (42R, 42G, and 42B), a cross dichroic prism 43, and three polarization plates 46 (46R, 46G, and 46B). It should be noted that in the present specification, the devices and the members provided to the respective colored lights of the three colors, namely red, green, and blue as in the case of the three wire grids 41, are denoted by the symbols suffixed with R, G, and B, respectively to thereby express the correspondence to the respective colors. Further, in the explanation common to the colored lights, the symbols might not be suffixed with R, G, and B.

The head body has an substantial L-shape in a side view, and is fixed to the case 2. The cross dichroic prism 43 is mounted on and fixed to the head body, and the projection lens 3 is supported by the head body. By fixing the head body to the case 2, the optical components of the optical device 40 and the projection lens 3 are aligned with respect to the illumination light axis OC.

Each of the wire grids 41 is disposed in a state tilted approximately 45° with respect to the light axis of the light to be input. The wire grid 41 performs polarization split on the incident light using the diffraction based on the grid structure by transmitting the polarized light having a polarization direction identical to the polarization direction of the polarization conversion element 23 while reflecting the polarized light having a polarization direction perpendicular thereto.

Each of the light modulation devices 42 is a reflective light modulation device, and is provided with the reflective liquid crystal panel 50 and a holding section 60 (see FIG. 2) for holding the reflective liquid crystal panel 50. The reflective liquid crystal panels 50 modulate the polarization directions of the polarized lights transmitted through the respective wire grids 41, and then reflect the polarized lights toward the respective wire grids 41. Only the polarized light having the polarization direction perpendicular to the polarization direction in which the polarized light is aligned by the polarization conversion element 23 out of the light modulated by the reflective liquid crystal panel 50 and reflected toward the wire grid 41 is reflected by the wire grid 41. It should be noted that detailed configuration of the light modulation device 42 will be described later.

The respective polarization plates 46 are disposed so as to face respective light incident side end surfaces 44 (44R, 44G, and 44B) of the cross dichroic prism 43, and transmit the linearly polarized lights having the polarization directions identical to the polarization directions of the lights reflected by the respective wire grids 41.

The cross dichroic prism 43 combines the respective colored lights reflected by the respective wire grids 41 and then input to the respective light incident side end surfaces 44 with each other and emits the result from a light exit side end surface 45. The cross dichroic prism 43 has a substantially rectangular planar shape composed of four rectangular prisms bonded to each other, and on the interfaces on which the rectangular prisms are bonded to each other, there are formed two dielectric multilayer films. These dielectric multilayer films each transmit the green light reflected by the wire grid 41G, and reflect the red and blue lights reflected by the wire grids 41R, 41B, respectively. As described above, the colored lights modulated by the respective reflective liquid crystal panels 50 are combined by the cross dichroic prism 43, and are then projected to the projection surface by the projection lens 3 in an enlarged manner.

As shown in FIG. 2, the optical device 40 is further provided with three mounting members 70 (70R, 70G, and 70B) and three adjustment members 76 (76R, 76G, and 76B) disposed for the respective colored lights of the three colors. It should be noted that although FIG. 2 shows one mounting member 70 and the components attached to the mounting member 70 as an example, the mounting member 70 and the components attached thereto corresponding to either of the colored lights of the three colors have substantially the same configuration.

The mounting member 70 is a hollow member having a triangular prism shape, and is made of, for example, synthetic resin. The mounting member 70 is provided with a first side surface 71 as a tilted surface, and second and third side surfaces 72, 73 forming an apex angle in between, and each of the side surfaces 71 through 73 is provided with an opening section. The mounting member 70 is disposed so that the third side surface 73 faces the adjustment member 76. The top surface and the bottom surface of the mounting member 70 are each provided with a concave engaging groove 74.

The wire grid 41 is fixed to the first side surface 71 by means of adhesion or the like. The light modulation device 42 is disposed on the second side surface 72 so that the side thereof to which the light is input faces the second side surface 72, and is fixed with screws 75 inserted through screw holes 61. The polarization plate 46 is fixed to the third side surface 73 by means of adhesion or the like. By fixing these components, the opening sections of the respective side surfaces 71 through 73 of the mounting member 70 become in the closed state.

Temperature rise occurs in the wire grid 41, the light modulation device 42, and the polarization plate 46 due to the light input thereto. In particular, the reflective liquid crystal panel 50 of the light modulation device 42 has the liquid crystal layer, the various wiring lines, the black matrix, and so on as described later, and therefore, the temperature rise occurs easily due to the absorption of the light by these constituents. Therefore, it is arranged that the cooling air is fed toward the mounting member 70 by the cooling fan described above to thereby cool the wire grid 41, the light modulation device 42, and the polarization plate 46.

The adjustment member 76 provided with a main body 77 and an arm section 78, and is attached to the light incident side end surface 44 of the cross dichroic prism 43 by means of adhesion or the like. A pair of arm sections 78 are disposed so as to project from the upper part and the lower part of the main body 77 toward the mounting member 70, and has clutch claws 79 at the respective tip portions. By engaging the clutch claws 79 with the engaging grooves 74, the mounting member 70 is attached to the adjustment member 76. Thus, the wire grid 41, the light modulation device 42, and the polarization plate 46 are fixed at predetermined positions with respect to the light incident side end surface 44 of the cross dichroic prism 43.

Light Modulation Device

Figure 3A:
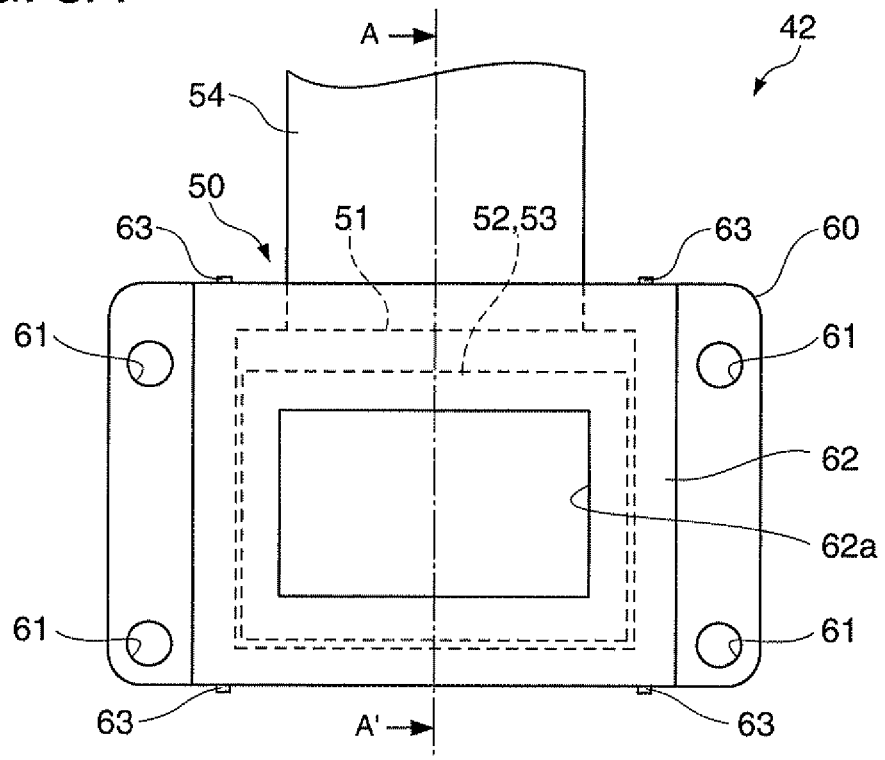
FIGS. 3A through 3C are diagrams showing a schematic configuration of the light modulation device according to the first embodiment.
Figure 3B:
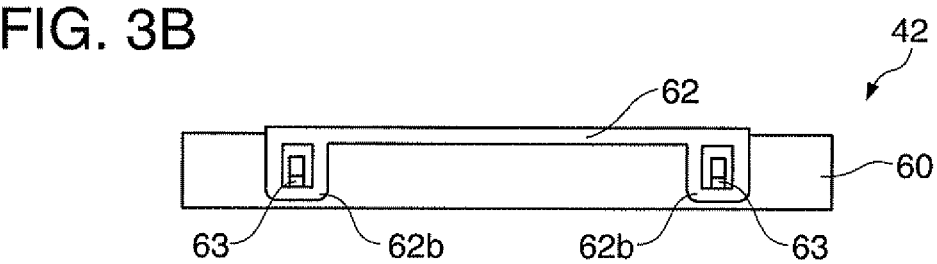
Figure 3C:
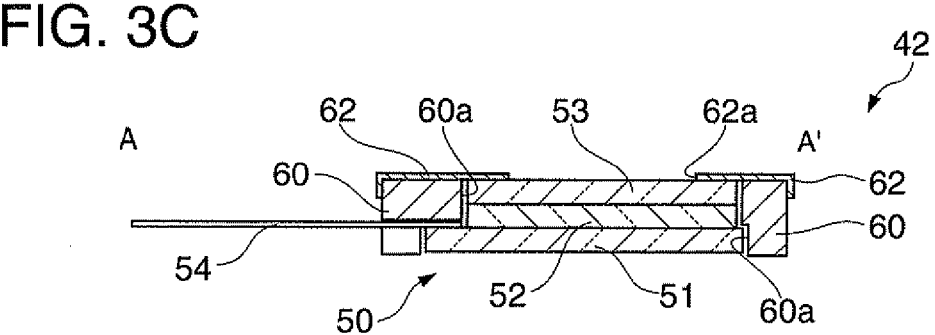

Then, a configuration of the light modulation device according to the first embodiment will be explained with reference to FIGS. 3A through 3C. FIGS. 3A through 3C are diagrams showing a schematic configuration of the light modulation device according to the first embodiment. In detail, FIG. 3A is a plan view, FIG. 3B is a side view, and FIG. 3C is a cross-sectional view along the line A-A' shown in FIG. 3A. As shown in FIGS. 3A, 3B, and 3C, the light modulation device 42 is provided with the reflective liquid crystal panel 50, a dust-proof glass 53, the holding section 60, and a light blocking plate 62.

The reflective liquid crystal panel 50 is a so-called liquid crystal on silicon (LCOS) having the liquid crystal layer formed on the silicon substrate. The reflective liquid crystal panel 50 has a component substrate 51 and an opposed substrate 52 having a roughly rectangular shape, and a liquid crystal layer having the liquid crystal as the electro-optic material encapsulated between the component substrate 51 and the opposed substrate 52.

The component substrate 51 is provided with various wiring lines such as scan lines and data lines intersecting each other, pixel electrodes arranged in, for example, a matrix so as to correspond to the intersections between the scan lines and the data lines, and thin film transistors (TFTs) electrically connected to the data lines, the scan lines, and the pixel electrodes.

The opposed substrate 52 is provided with a common electrode for generating electrical fields with the pixel electrodes, and a black matrix for partitioning off the areas of the respective pixels. The planar size of the component substrate 51 is one size larger than the planar size of the opposed substrate 52, and one end of the component substrate is provided with a connection terminal section for electrical connection with the control device.

A flexible printed wiring board 54 is electrically connected and fixed to the connection terminal section of the component substrate 51. The drive signals from the control device are input to the reflective liquid crystal panel 50 via the flexible printed wiring board 54. In the reflective liquid crystal panel 50, the orientational state of the liquid crystal is controlled in accordance with the drive signals from the control device, and the polarized light input from the side of the opposed substrate 52 is modulated in the polarization direction, and is emitted from the side of the opposed substrate 52. Hereinafter, in the light modulation device 42 (the reflective liquid crystal panel 50), the side of the opposed substrate 52 is referred to as an incident side, and the side of the component substrate 51 is referred to as a rear side.

The holding section 60 holds the reflective liquid crystal panel 50, and is attached to the mounting member 70 (see FIG. 2). The holding section 60 is formed to have a roughly rectangular solid shape using, for example, a metal material such as a magnesium alloy or an aluminum alloy, or heat resistant resin. The holding section 60 has an opening 60a for housing the reflective liquid crystal panel 50 and the dust-proof glass 53 at roughly the center portion thereof, the screw holes 61 for attaching the holding section 60 to the mounting member 70 at four corners thereof, and hooks 63 for fixing the light blocking plate 62 on a side surface thereof. Further, the portion of the holding section 60 on which the flexible printed wiring board 54 is disposed is cut out.

The reflective liquid crystal panel 50 (the component substrate 51 and the opposed substrate 52) is housed inside the opening 60a, and is fixed to the holding section 60 by means of adhesion or the like. The dust-proof glass 53 is housed inside the opening 60a, and is fixed to the surface of the opposed substrate 52 by means of adhesion or the like. The dust-proof glass 53 is made of quartz glass, sapphire, quartz crystal, or the like. The dust-proof glass 53 prevents the dust from being attached to incident side surface of the opposed substrate 52. Further, even if the dust is attached to the surface of the dust-proof glass 53, the position is shifted from the focal position, and therefore it is arranged that the shadow of the dust in the image light to be projected becomes inconspicuous.

The light blocking plate 62 is disposed on the incident side of the holding section 60 so as to have contact with the surface of the dust-proof glass 53. The light blocking plate 62 is formed of a substantially rectangular plate member using sheet metal processing or the like. The light blocking plate 62 is made of a material having a thermal conductivity no lower than the thermal conductivity of the material forming the holding section 60, for example, a metal material such as an aluminum alloy or copper.

The light blocking plate 62 has an opening 62a provided to a plate section roughly parallel to the dust-proof glass 53, and hook latching sections 62b extending round the side surface of the holding section 60 provided with the hooks 63 from the plate section. The opening 62a is disposed so as to overlap the area of the reflective liquid crystal panel 50 where the pixel electrodes are arranged. The light blocking plate 62 is fixed to the holding section 60 by the hook latching sections 62b being latched with the hooks 63.

The light blocking plate 62 has a function of preventing that the light reflected by the reflective liquid crystal panel 50 is reflected by the wire grid 41, the polarization plate 46, the cross dichroic prism 43, and so on to thereby take in the drive section of the reflective liquid crystal panel 50, and thus the reflective liquid crystal panel 50 malfunctions. Further, the light blocking plate 62 has a function of radiating the heat transferred from the reflective liquid crystal panel 50 via the dust-proof glass 53 and the heat transferred from the reflective liquid crystal panel 50 via the holding section 60.

Incidentally, the light modulation device 42 is attached to the mounting member 70 so that the incident side faces to the second side surface 72 (see FIG. 2). Further, since the openings of the side surfaces 71 through 73 of the mounting member 70 are blocked, the inner space of the mounting member 70 is in a substantially sealed state. Therefore, in the light modulation device 42, the cooling air is easily guided to the rear side of the reflective liquid crystal panel 50 but is hard to be guided to the incident side thereof compared to the case of the transmissive light modulation device in which the cooling air is guided to both of the incident side and the rear side.

Although in the projector described in Document 1 the light modulation device is attached so that the incident side thereof faces to the mounting member similarly to the case of the present embodiment, the light modulation device is not provided with the light blocking plate. Therefore, the heat radiation on the incident side in the reflective liquid crystal panel is harder to be performed, and therefore, the heat radiation on the incident side becomes insufficient compared to the rear side thereof.

Further, even in the case in which another projector has a configuration of having the light modulation device provided with the light blocking plate, SUS (steel special use stainless) is often used as the material of the light blocking plate in the related art. If SUS is used as the material of the light blocking plate, the heat radiation in the incident side is not sufficiently performed by the light blocking plate since SUS has a thermal conductivity lower than those of the magnesium alloy and the aluminum alloy. Therefore, cooling of the reflective liquid crystal panel becomes insufficient to thereby cause the reflective liquid crystal panel to be exposed to a high-temperature environment, and as a result, the quality of the reflective liquid crystal panel might be deteriorated.

According to the configuration of the light modulation device 42 related to the first embodiment, since the thermal conductivity of the material of the light blocking plate 62 is equal to or higher than the thermal conductivity of the material of the holding section 60, the heat radiation from the incident side of the reflective liquid crystal panel 50 is promoted than in the related art. Thus, since it is possible to efficiently cool the reflective liquid crystal panel 50, the deterioration in the quality of the reflective liquid crystal panel 50 due to the heat can be prevented, and as a result, the light modulation device 42 can modulate the incident light stably for a long period of time.

Further, the projector 1 according to the first embodiment is provided with the light modulation device 42 described above, and is therefore capable of projecting the image light with preferable quality for a long period of time. As a result, the longer product life of the projector 1 can be achieved.

It should be noted that the method of forming the light blocking plate 62 is not limited to the sheet metal processing, metal mold casting can also be used. By forming the light blocking plate 62 to have a larger thickness than the light blocking plate of the related art using the metal mold casting or the like, the heat radiation effect by the light blocking plate can further be enhanced.

Second Embodiment

Light Modulation Device

Figure 4:
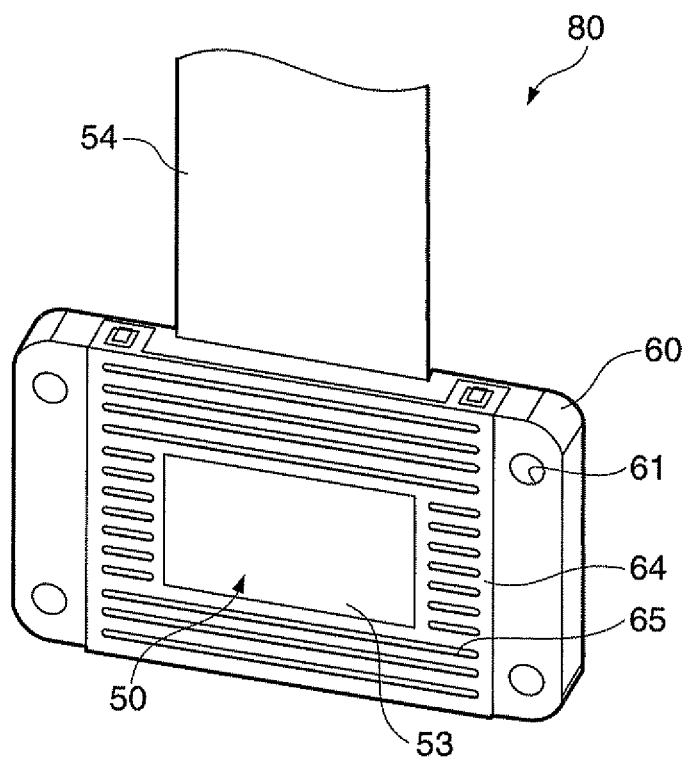
FIG. 4 is a diagram showing a schematic configuration of a light modulation device according to a second embodiment.

Then, a light modulation device according to a second embodiment will be explained with reference to FIG. 4. FIG. 4 is a diagram showing a schematic configuration of the light modulation device according to the second embodiment. The light modulation device according to the second embodiment is different from the light modulation device according to the first embodiment in the point that a concavo-convex pattern is provided to the surface of the light blocking plate, and is substantially the same in the rest of the configuration. The constituents common to the first embodiment are denoted with the same reference symbols, and the explanation therefor will be omitted.

As shown in FIG. 4, a light modulation device 80 according to the second embodiment is provided with the reflective liquid crystal panel 50, the dust-proof glass 53, the holding section 60, and a light blocking plate 64. The light blocking plate 64 has a concavo-convex pattern 65 on the surface on the incident side. The concave-convex pattern 65 is provided by, for example, forming concave portions or convex portions having, for example, a linear shape or dotted shape on the incident side surface of the plate-like light blocking plate 64 formed using, for example, sheet metal processing. It is also possible to adopt the configuration of forming the light blocking plate 64 using the metal mold casting method, and forming the concavo-convex pattern 65 with the metal mold at that occasion.

According to the configuration of the light modulation device 80 related to the second embodiment, since the concavo-convex pattern 65 is provided to the incident side surface of the light blocking plate 64, the surface area of the heat radiation surface of the light blocking plate 64 is enlarged. Thus, since the heat radiation effect of the light blocking plate 64 can be enhanced, it is possible to more effectively cool the reflective liquid crystal panel 50.

Further, the light to be reflected by the surface of the light blocking plate 64 out of the polarized light transmitted through the wire grid 41, namely the reflected light not to be modulated by the reflective liquid crystal panel 50, is scattered by the concavo-convex pattern 65 and is directed to the outside of the light path of the reflected light modulated by the reflective liquid crystal panel 50. Thus, it is prevented that the light reflected by the surface of the light blocking plate 64 is mixed into the light modulated by the reflective liquid crystal panel 50.

Third Embodiment

Light Modulation Device

Figure 5:
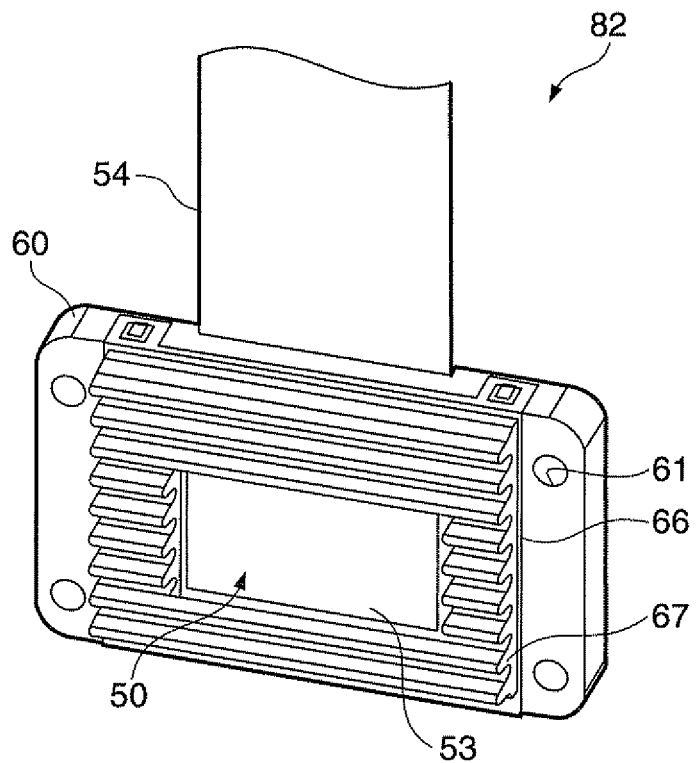
FIG. 5 is a diagram showing a schematic configuration of a light modulation device according to a third embodiment.

Then, a light modulation device according to a third embodiment will be explained with reference to FIG. 5. FIG. 5 is a diagram showing a schematic configuration of the light modulation device according to the third embodiment. The light modulation device according to the third embodiment is different from the light modulation device according to the first embodiment in the point that a fin-like section is provided to the surface of the light blocking plate, and is substantially the same in the rest of the configuration. The constituents common to the embodiments described above are denoted with the same reference symbols, and the explanation therefor will be omitted.

As shown in FIG. 5, a light modulation device 82 according to the third embodiment is provided with the reflective liquid crystal panel 50, the dust-proof glass 53, the holding section 60, and a light blocking plate 66. The light blocking plate 66 has a fin-like section 67 on the surface on the incident side.

The fin-like section 67 is formed from a metal material such as an aluminum alloy separately from the light blocking plate 66, and is fixed to the light blocking plate 66 so as to be connected thereto in a thermally conductive manner. As the method of connecting and fixing the fin-like section 67 to the light blocking plate 66, for example, soldering, weld, bonding with a thermally conductive adhesive, fixing with screws can be applied. Further, it is also possible to adopt a configuration of forming the fin-like section 67 integrally with the light blocking plate 66 using the metal mold casting method.

According to the configuration of the light modulation device 82 related to the third embodiment, since the fin-like section 67 is provided to the incident side surface of the light blocking plate 66, the heat radiation from the incident side of the reflective liquid crystal panel 50 is further promoted. Thus, the reflective liquid crystal panel 50 can more effectively be cooled.

Fourth Embodiment

Light Modulation Device

Figure 6A:
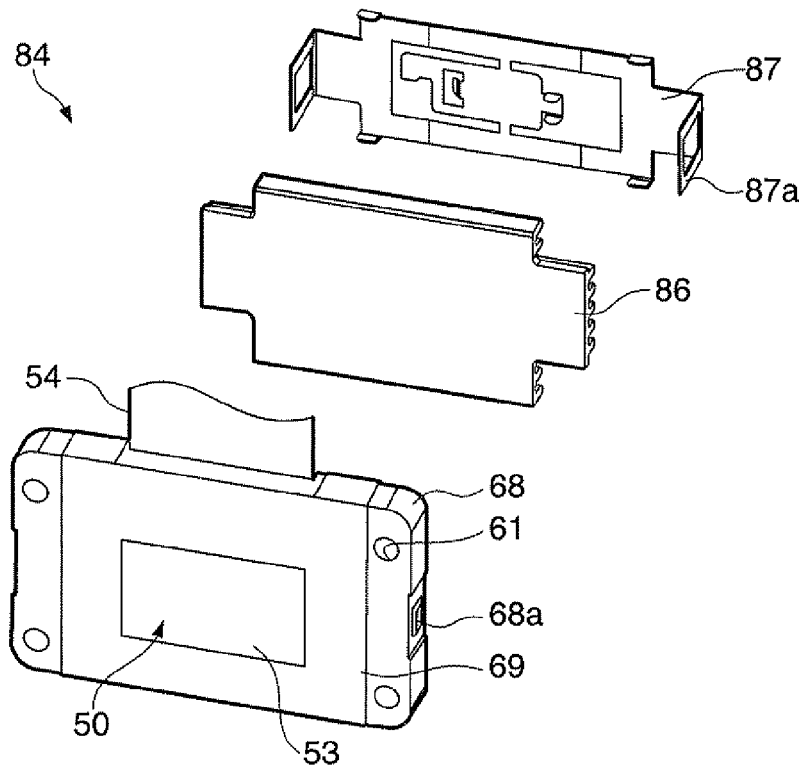
FIGS. 6A through 6C are diagrams showing a schematic configuration of a light modulation device according to a fourth embodiment.
Figure 6B:
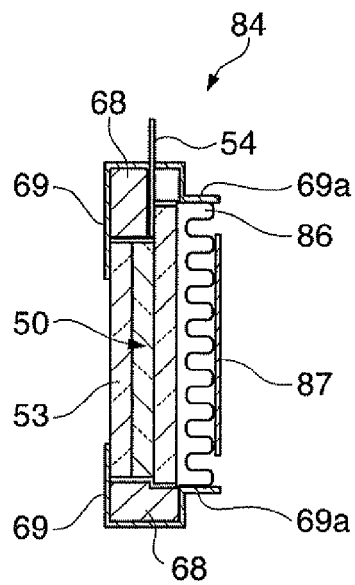
Figure 6C:
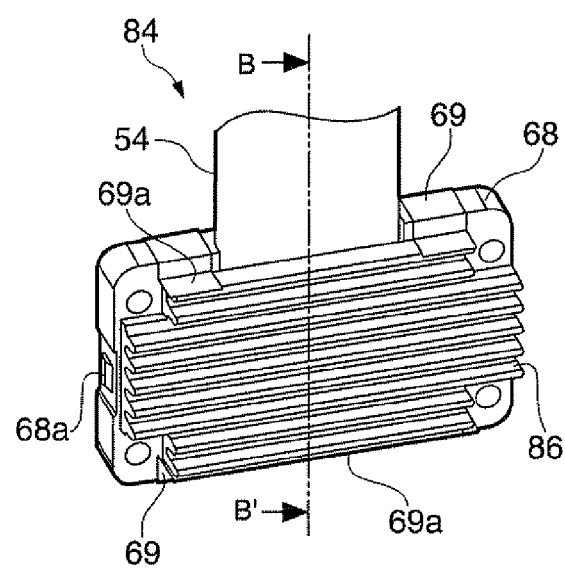

Then, a light modulation device according to a forth embodiment will be explained with reference to FIGS. 6A through 6C. FIGS. 6A through 6C are diagrams showing a schematic configuration of the light modulation device according to the fourth embodiment. In detail, FIG. 6A is perspective view thereof viewed from the incident side, FIG. 6B is a cross-sectional view along the line B-B' in FIG. 6C, and FIG. 6C is a perspective view thereof viewed from the rear side. It should be noted that in FIG. 6A the members disposed on the rear side are shown in an exploded manner. Further, a holding member 87 is omitted in FIG. 6C.

The light modulation device according to the fourth embodiment is different from the light modulation device according to the first embodiment in the point that a heat sink is further provided on the rear side, and the light blocking plate is connected to the heat sink in a thermally conductive manner, and is substantially the same in the rest of the configuration. The constituents common to the embodiments described above are denoted with the same reference symbols, and the explanation therefor will be omitted.

As shown in FIGS. 6A, 6B, and 6C, a light modulation device 84 according to the fourth embodiment is provided with the reflective liquid crystal panel 50, the dust-proof glass 53, the holding section 68, a light blocking plate 69, a heat sink 86, and the holding member 87. The holding section 68 is different from the holding section 60 in the embodiments described above in the point that it has hooks 68a for fixing the holding member 87, and is substantially the same in the rest of the configuration.

The light blocking plate 69 is different from the light blocking plate 62 according to the first embodiment in the point that the portion extending from the plate section on the incident side if formed so as to further extend from the side surface of the holding section 68 round the rear side. The light blocking plate 69 is fixed to the holding section 68 so as to hold the holding section 68 with the portion, which extends from the side surface of the holding section 68 round the rear side, from the both sides.

Further, the light blocking plate 69 has a connection section 69a on the rear side, and is connected to the heat sink 86 at the connection section 69a in a thermally conductive manner. As the method of connecting the light blocking plate 69 to the heat sink 86 in a thermally conductive manner, although it is sufficient only to make the connection section 69a have contact with the heat sink 86, it is preferable to fix the connection section 69a to the heat sink 86 by soldering, weld, bonding with an adhesive having a thermally conductive property, fixing with screws, and so on.

The heat sink 86 is disposed on the rear side of the holding section 68, so as to have contact with the rear side (the component substrate 51) of the reflective liquid crystal panel 50. The heat sink 86 is made of a metal material such as an aluminum alloy. The heat of the reflective liquid crystal panel 50 is transferred to the heat sink 86, and is radiated from the heat sink 86 to the outside.

The holding member 87 is attached to the rear side of the holding section 68, and holds the heat sink 86 together with the holding section 68 in between. The holding member 87 has hook latching sections 87a, and is fixed to the holding section 68 while holding the heat sink 86 by the hook latching sections 87a being latched to the hooks 68a.

According to the light modulation device 84 related to the fourth embodiment, since the heat sink 86 is disposed on the rear side, which is the opposite side to the incident side to be attached to the mounting member 70 (see FIG. 2), and to which the cooling air from the cooling fan is guided, the heat radiation from the rear side of the reflective liquid crystal panel 50 can be promoted. Further, since the light blocking plate 69 is connected to the heat sink 86 in a thermally conductive manner, the heat on the incident side of the reflective liquid crystal panel 50 can be transferred to the heat sink 86, and then can be radiated also from the rear side. Thus, the reflective liquid crystal panel 50 can more effectively be cooled.

It should be noted that in the fourth embodiment it is also possible to adopt the configuration in which the light modulation device 84 is further provided with a thermally conductive sheet disposed between the reflective liquid crystal panel 50 and the heat sink 86. As the thermally conductive sheet, a sheet-like member having high thermal conductivity and flexibility such as a graphite sheet can be used. According to such a configuration, since the degradation of thermal conduction due to the gap caused between the reflective liquid crystal panel 50 and the heat sink 86 can be prevented, and at the same time, the heat of the reflective liquid crystal panel 50 is also radiated from the thermally conductive sheet, it becomes possible to perform cooling of the reflective liquid crystal panel 50 more effectively.

The embodiments of the invention are explained hereinabove, and the embodiments can be modified in various manners within the scope of the invention. The following modified examples are possible.

First Modified Example

Although in the light modulation device 84 according to the fourth embodiment the light blocking plate 69 is connected to the heat sink 86 in a thermally conductive manner, it is also possible to adopt the configuration in which the light blocking plate 64 having the concavo-convex pattern 65 in the second embodiment or the light blocking plate 66 having the fin-like section 67 in the third embodiment is connected to the heat sink 86 in a thermally conductive manner. According to this configuration, since it is possible to transfer the heat on the incident side of the reflective liquid crystal panel 50 to the heat sink 86 and then radiate the heat also from the rear side, the reflective liquid crystal panel 50 can more effectively be cooled.

Second Modified Example

Although in the light modulation devices 42, 80, 82 in the first, second, and third embodiments the light blocking plates 62, 64, and 66 are formed so as to extend to the side surface of the holding section 60, the invention is not limited thereto. It is also possible to adopt a configuration in which the light blocking plates 62, 64, and 66 are formed so as to further extend to the rear side of the holding section 60. By adopting such a configuration, since the surface area of the light blocking plates 62, 64, and 66 are further enlarged, and at the same time the cooling air guided to the rear side becomes easy to blow the light blocking plates 62, 64, and 66, the heat on the incident side of the reflective liquid crystal panel 50 can also be radiated from the rear side.

Third Modified Example

Although the projector 1 in the embodiments described above is a projector using three reflective liquid crystal panels 50, the invention is not limited thereto. The invention can also be applied to the projector using, for example, one reflective liquid crystal panel 50, two, four, or more reflective liquid crystal panels 50. In such a case, it results that the projector is provided with the same number of wire grids, polarization plates, the mounting members, and so on as the number of reflective liquid crystal panels.

Fourth Modified Example

Although the projector 1 in the embodiments described above is a front projection projector for projecting the projection images from the observation side, the invention is not limited thereto. The invention can also be applied to a rear projection projector for projecting the projection image from the opposite side to the observation side.

The present application claim priority from Japanese Patent Application No. 2010-141384 filed on Jun. 23, 2010, which is hereby incorporated by reference in its entirety.

What is claimed is:
1. A light modulation device comprising:
 a reflective light modulation element modulating an incident light;
 a holding section holding the reflective light modulation element; and
 a light blocking plate disposed on an incident side of the holding section on which the light directing to the reflective light modulation element is incident, and fixed to the holding section, wherein
 the light blocking plate has a concavo-convex pattern on a surface on the incident side.
2. A projector comprising:
 a light source;
 a light modulation device according to claim 1, and adapted to modulate the light emitted from the light source; and
 a projection optical device which projects a light modulated by the light modulation device.
3. A light modulation device comprising:
 a reflective light modulation element modulating an incident light;
 a holding section holding the reflective light modulation element; and
 a light blocking plate disposed on an incident side of the holding section on which the light directing to the reflective light modulation element is incident, and fixed to the holding section, wherein
 the light blocking plate has a fin-like section on a surface on the incident side.

4. A projector comprising:

a light source;

a light modulation device according to claim 3, and adapted to modulate the light emitted from the light source; and a projection optical device which projects a light modulated by the light modulation device.

5. A light modulation device comprising:

a reflective light modulation element modulating an incident light;

a holding section holding the reflective light modulation element;

a light blocking plate disposed on an incident side of the holding section on which the light directing to the reflective light modulation element is incident, and fixed to the holding section; and a heat sink disposed on an opposite side to the incident side of the reflective light modulation element, wherein the light blocking plate has a connection section, and the connection section contacts and fixes the heat sink.

6. A projector comprising:

a light source;

a light modulation device according to claim 5, and adapted to modulate the light emitted from the light source; and a projection optical device which projects a light modulated by the light modulation device.

* * * * *